United States Patent
Takimoto et al.

(10) Patent No.: US 10,514,314 B2
(45) Date of Patent: Dec. 24, 2019

(54) SENSOR UNIT HAVING A SENSOR CHIP AND PRESSURE DETECTION DEVICE CONTAINING SAME

(71) Applicant: SAGINOMIYA SEISAKUSHO, INC., Tokyo (JP)

(72) Inventors: Kazuya Takimoto, Sayama (JP); Kazunori Hirai, Sayama (JP); Hideaki Koga, Sayama (JP)

(73) Assignee: SAGINOMIYA SEISAKUSHO, INC., Tokyo (JP)

( * ) Notice: Subject to any disclaimer, the term of this patent is extended or adjusted under 35 U.S.C. 154(b) by 281 days.

(21) Appl. No.: 15/318,633

(22) PCT Filed: Jun. 1, 2015

(86) PCT No.: PCT/JP2015/002767
§ 371 (c)(1),
(2) Date: Dec. 13, 2016

(87) PCT Pub. No.: WO2015/194105
PCT Pub. Date: Dec. 23, 2015

(65) Prior Publication Data
US 2017/0131169 A1    May 11, 2017

(30) Foreign Application Priority Data
Jun. 17, 2014   (JP) ................. 2014-124592

(51) Int. Cl.
*G01L 19/06* (2006.01)
*G01L 19/14* (2006.01)
*G01L 19/00* (2006.01)

(52) U.S. Cl.
CPC ........ *G01L 19/069* (2013.01); *G01L 19/0046* (2013.01); *G01L 19/0645* (2013.01); *G01L 19/14* (2013.01); *G01L 19/147* (2013.01)

(58) Field of Classification Search
CPC .............. G01L 19/069; G01L 19/0046; G01L 19/0645; G01L 19/14; G01L 19/147
(Continued)

(56) References Cited

U.S. PATENT DOCUMENTS 4,838,089 A * 6/1989 Okada ................. G01L 19/0038
338/4
5,948,991 A * 9/1999 Nomura ............ B29C 45/14639
73/727
(Continued)

FOREIGN PATENT DOCUMENTS

| CN | 102917527 A | 2/2013 |
| CN | 103487202 A | 1/2014 |

(Continued)

OTHER PUBLICATIONS

Translation of WO-2009087767 A1—Suzuki (Year: 2009).*
(Continued)

*Primary Examiner* — Nathaniel T Woodward
(74) *Attorney, Agent, or Firm* — Workman Nydegger; Carl Reed

(57) ABSTRACT

In a sensor unit, a lower end surface of a terminal block (24) is attached to an upper end surface (12ES1) of a housing (12) by using a silicone-based adhesive in such a way as to cover an upper end surface (14ES1) of a hermetic glass (14). A covering layer (10A) made of a silicone-based adhesive is formed in a given thickness on the entire upper end surface (14ES1) of the hermetic glass (14), from which a group of input-output terminals (40ai) protrude.

15 Claims, 14 Drawing Sheets

(58) Field of Classification Search
USPC .......................................................... 73/723
See application file for complete search history.

(56) References Cited

U.S. PATENT DOCUMENTS

| | | | | |
|---|---|---|---|---|
| 6,732,590 | B1* | 5/2004 | Gottlieb | B60C 23/0408 73/754 |
| 2004/0055387 | A1* | 3/2004 | Miyazaki | G01L 19/0038 73/754 |
| 2006/0075821 | A1* | 4/2006 | Otsuka | G01L 19/0084 73/715 |
| 2006/0179954 | A1* | 8/2006 | Suzuki | G01L 19/0645 73/756 |
| 2006/0213276 | A1* | 9/2006 | Ueyanagi | G01L 19/0084 73/754 |
| 2007/0095145 | A1* | 5/2007 | Sato | G01L 19/0038 73/716 |
| 2008/0098819 | A1* | 5/2008 | Murata | G01L 19/02 73/708 |
| 2011/0016981 | A1 | 1/2011 | Gebauer et al. | |
| 2016/0069765 | A1 | 3/2016 | Ishikawa et al. | |
| 2016/0076960 | A1* | 3/2016 | Sato | B21K 21/12 73/723 |

FOREIGN PATENT DOCUMENTS

| | | | |
|---|---|---|---|
| JP | 2003-302300 A | 10/2003 | |
| JP | 3687386 B | 7/2007 | |
| JP | 3987386 B | 7/2007 | |
| JP | 2011510276 A | 3/2011 | |
| JP | 2012068105 A | 4/2012 | |
| JP | 2014098685 A | 5/2014 | |
| JP | 2014107482 A | 6/2014 | |
| WO | 2009/087767 A1 | 7/2009 | |
| WO | WO-2009087767 A1 * | 7/2009 | ......... G01L 19/0061 |
| WO | 2014/122855 A1 | 8/2014 | |

OTHER PUBLICATIONS

Extended European Search Report dated Jan. 22, 2018, issued in EP Application No. 15810013.1.
Office Action dated Jun. 21, 2018 issued in corresponding Korean Patent Application No. 10-2016-7034910.
International Preliminary Report on Patentability and Written Opinion dated Dec. 29, 2016, issued in PCT Application No. PCT/JP2015/002767, filed Jun. 1, 2015.
Office Action dated Nov. 1, 2018 in corresponding Chinese Patent Application No. 201580032263.3.

* cited by examiner

SENSOR UNIT HAVING A SENSOR CHIP AND PRESSURE DETECTION DEVICE CONTAINING SAME

TECHNICAL FIELD

The present invention relates to a sensor unit provided with a sensor chip, and a pressure detection device containing the sensor unit.

BACKGROUND ART

As shown in PATENT DOCUMENT 1 and PATENT DOCUMENT 2, for example, a liquid seal type semiconductor pressure sensor constitutes part of a sensor unit. The sensor unit is placed inside a pressure detection chamber formed on an inner side of a metallic joint portion connected to a housing to be described later. For example, the sensor unit comprises, as its main constituents: a diaphragm supported inside the joint portion and configured to isolate the above-mentioned pressure detection chamber from a liquid seal chamber to be described later; the liquid seal chamber formed above the diaphragm and configured to trap a silicone oil serving as a pressure transfer medium; a sensor chip placed inside the liquid seal chamber and configured to detect a pressure fluctuation of the silicone oil through the diaphragm; a chip mounting member configured to support the sensor chip; a hermetic glass sealing a portion around the chip mounting member in a through-hole in the housing; and a group of terminals configured to send an output signal from the sensor chip and to supply power to the sensor chip.

The hermetic glass is fixed to the inside of a metallic element body placed inside a cover member. The element body is disposed inside the cover member in such a way as to come into contact with the metallic joint portion. In addition, the aforementioned group of terminals are located adjacent to the chip mounting member, are fixed to the inside of the hermetic glass, and are electrically connected to external lead wires.

PRIOR ART DOCUMENTS

Patent Document

PATENT DOCUMENT 1: Japanese Patent Application Laid-Open No. 2014-98685
PATENT DOCUMENT 2: Japanese Patent Application Laid-Open No. 2012-68105

SUMMARY OF INVENTION

An internal circuit in the sensor chip as described above may be destroyed by a high voltage attributed to electrostatic discharge (ESD). The above-mentioned sensor unit has a risk that the high voltage attributed to the electrostatic discharge may be applied to the internal circuit in the sensor chip through a path from the aforementioned joint portion and the element body to the sensor chip, or a path from the external lead wires and the group of terminals to the sensor chip. One possible countermeasure in this case is to incorporate an ESD protection circuit into the sensor chip. However, there is a case where it is difficult to incorporate the ESC protection circuit due to reduction in area for the ESD protection circuit inside the sensor chip to meet a demand for downsizing the sensor chip.

In view of the above-described problem, the present invention aims to provide a sensor unit and a pressure detection device containing the same. The sensor unit and a pressure detection device containing the same can improve its resistance to static electricity without being affected by the presence or absence of an ESD protection circuit.

To achieve the above-described object, a sensor unit according to the present invention includes: a sensor chip configured to detect a pressure; a housing configured to accommodate the sensor chip and a hermetic glass surrounding at least one terminal to be electrically connected to a circuit in the sensor chip; a diaphragm configured to isolate the sensor chip and the terminal from a pressure chamber where a pressure is to be detected; and a pressure transfer medium filled between the diaphragm and the sensor chip. An electrostatic protection layer made of an adhesive selected according to a component of the pressure transfer medium is formed to cover any of one end surface of the hermetic glass from which the terminal protrudes, one end surface of the housing, and a surface defined by a portion of the terminal protruding from the one end surface of the hermetic glass. A silicone-based adhesive may be selected when the pressure transfer medium is a silicone oil. Moreover, the silicone-based adhesive or a fluorine-based adhesive may be selected when the pressure transfer medium is a fluorine-based liquid.

Also, the sensor unit according to the present invention includes: a sensor chip configured to detect a pressure; a housing configured to accommodate the sensor chip and a hermetic glass surrounding at least one terminal to be electrically connected to a circuit in the sensor chip; a diaphragm configured to isolate the sensor chip and the terminal from a pressure chamber where a pressure is to be detected; and a pressure transfer medium filled between the diaphragm and the sensor chip, and an electrostatic protection layer made of a filling material selected according to a component of the pressure transfer medium is formed to cover any of one end surface of the hermetic glass from which the terminal protrudes, one end surface of the housing, and a surface defined by a portion of the terminal protruding from the one end surface of the hermetic glass. An elastomer or a fluorine grease may be selected when the pressure transfer medium is the fluorine-based liquid.

Moreover, a pressure detection device according to the present invention includes: a sensor unit accommodating portion configured to accommodate the above-mentioned sensor unit, and a terminal block configured to align the terminals of the sensor unit, an end portion of the terminal block to align the terminals is attached to the one end surface of the housing with any one of a silicone-based adhesive and a fluorine-based adhesive, and a peripheral edge of the diaphragm is joined to another end surface of the housing. Furthermore, a covering layer made of an epoxy-based resin or a silicone-based resin may be formed on an upper surface of a sealing member which seals the terminal block and the housing.

The electrostatic protection layer may be formed only at a portion surrounded by the end portion of the terminal block, an inner peripheral surface of the housing, and the one end surface of the hermetic glass. Also, the electrostatic protection layer may be formed only at a portion on the terminal from the one end surface of the hermetic glass to the terminal block. Further, the electrostatic protection layer may be formed only at a portion from an annular projection formed adjacent to the terminal on the terminal block to the one end surface of the hermetic glass opposed to the projection.

Furthermore, the pressure detection device according to the present invention includes: a sensor unit accommodating portion configured to accommodate the above-mentioned sensor unit, and a terminal block configured to align the terminals of the sensor unit, an end portion of the terminal block is joined to the one end surface of the housing with the filling material, and a peripheral edge of the diaphragm is joined to another end surface of the housing. A coating layer made of an epoxy-based resin may be formed on an upper surface of a sealing member which seals the terminal block and the housing. Alternatively, a coating layer made of a silicone-based resin may be formed on the upper surface of the sealing member which seals the terminal block and the housing.

According to the sensor unit and the pressure detection device containing the same of the present invention, the electrostatic protection layer made of the adhesive is formed on the one end surface of the hermetic glass from which the terminal protrudes, and on the one end surface of the housing. Thus, the sensor unit can improve resistance to static electricity without being affected by the presence or absence of an ESD protection circuit.

DESCRIPTION OF EMBODIMENTS

Figure 1:
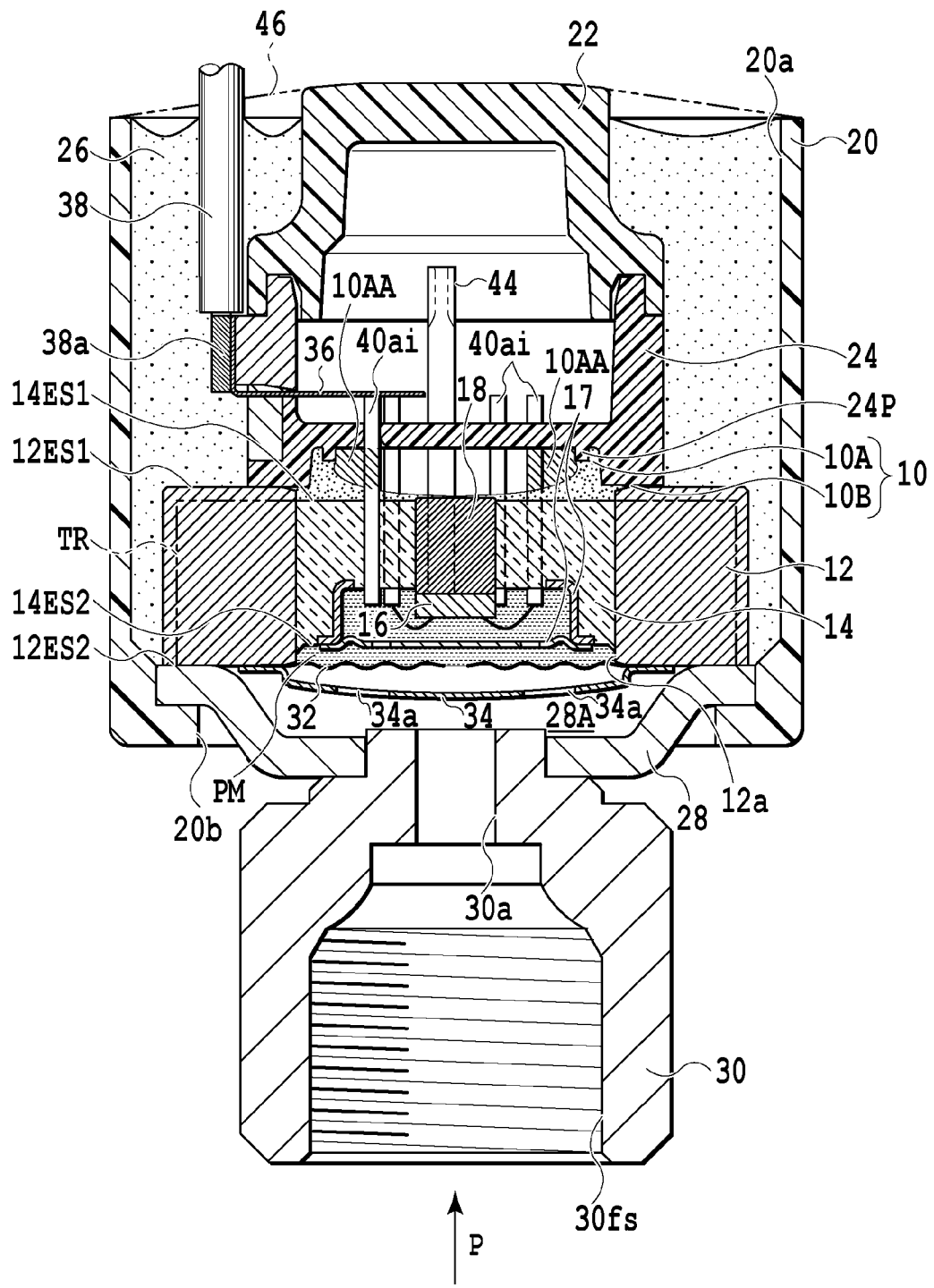
FIG. 1 is a cross-sectional view showing an example of a sensor unit and a pressure detection device containing the same according to the present invention.

FIG. 1 schematically shows an example of a sensor unit and a pressure detection device containing the same according to the present invention.

In FIG. 1, the pressure detection device comprises a joint member 30 connected to a pipe to which a fluid being a target of pressure detection is introduced, and a sensor unit accommodating portion connected to a base plate 28 of the joint member 30 and configured to accommodate a sensor unit to be described later and to supply a detection output signal from a sensor chip to a given pressure detection device.

The metallic joint member 30 is provided in its inside with a female screw portion 30fs to be threadedly engaged with a male screw portion on the aforementioned pipe. The female screw portion 30fs communicates with a port 30a, which guides the fluid supplied from a direction indicated with an arrow P into a pressure chamber 28A to be described later. One of open ends of the port 30a is open toward the pressure chamber 28A, which is formed between the base plate 28 of the joint member 30 and a diaphragm 32 of the sensor unit.

A contour of the sensor unit accommodating portion is formed from a cylindrical waterproof casing 20 serving as a cover member. An opening 20b is formed at a lower end portion of the waterproof casing 20 made of a resin. A peripheral edge of the base plate 28 of the joint member 30 is engaged with a stepped portion at a peripheral edge of the opening 20b located inside.

Either air or a liquid serving as a fluid is supplied into the pressure chamber 28A through the port 30a of the joint member 30. A lower end surface 12ES2 of a housing 12 of the sensor unit is mounted on the base plate 28.

The sensor unit which detects a pressure inside the pressure chamber 28A and sends the detection output signal comprises, as its main constituents: the cylindrical housing 12; the metallic diaphragm 32 that isolates the pressure chamber 28A from an inner peripheral portion of the housing 12; a sensor chip 16 that includes multiple pressure detection elements; a metallic chip mounting member 18 that supports the sensor chip 16 at one end portion of the member 18 through the a glass layer; a group of input-output terminals 40ai that are electrically connected to the sensor chip 16; and a hermetic glass 14 that fixes the group of input-output terminals 40ai and an oil filling pipe 44 to a space between an outer peripheral surface of the chip mounting member 18 and an inner peripheral surface of the housing 12.

The diaphragm 32 is supported by the lower end surface 12ES2 on one side of the housing 12, which is the surface opposed to the above-described pressure chamber 28A. A diaphragm protection cover 34 placed in the pressure chamber 28A and configured to protect the diaphragm 32 is provided with multiple communication holes 34a. A peripheral edge of the diaphragm protection cover 34 is joined by welding, together with the peripheral edge of the diaphragm 32, to the lower end surface 12ES2 of the housing 12 made of stainless steel.

In a liquid seal chamber formed between the sensor chip 16 opposed to the metallic diaphragm 32 and an end surface of the hermetic glass 14, a prescribed amount of any of silicone oil PM and a fluorine-based inert liquid, for example, each of which serves as a pressure transfer medium, is filled through the oil filling pipe 44. Note that one end portion of the oil filling pipe 44 is crushed and blocked up as illustrated with chain double-dashed lines after filling the oil. For example, a silicone oil having a dimethylsiloxane structure formed from a siloxane bond and an organic methyl group is used as the silicone oil.

The silicone oil may be dimethyl silicone oil, for example, in which methyl groups are linked to all side chains and terminals of polysiloxane, respectively, as shown in the following structural formula.

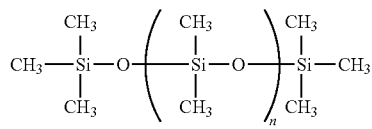

Formula 1

In addition, the silicone oil may be methylphenyl silicone oil, for example, in which phenyl groups are linked to certain side chains of polysiloxane as shown in the following structural formula.

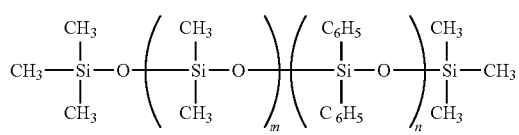

Formula 2

Moreover, the silicone oil may be methylhydrogen silicone oil, for example, in which hydrogen is linked to a certain side chain of polysiloxane as shown in the following structural formula.

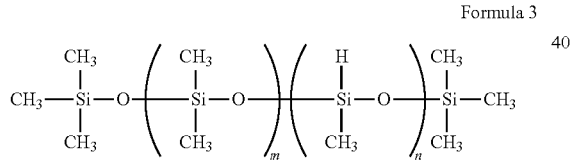

Formula 3

Furthermore, the silicone oil may be ones in which organic bases are introduced into certain side chain and/or terminal(s) as respectively shown in the following structural formulae.

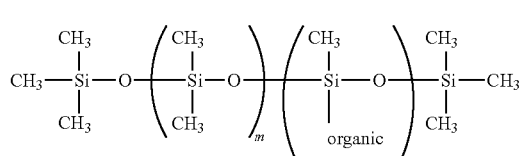

Formula 4

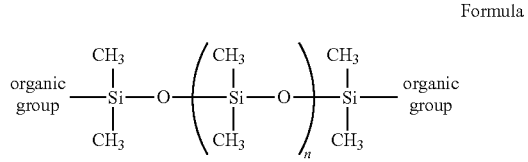

Formula 5

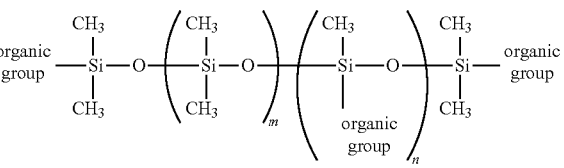

Formula 6

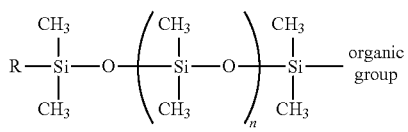

Formula 7

In the meantime, the fluorine-based inert liquid may be any of a liquid having a perfluorocarbon structure, a liquid having a hydrofluoroether structure, and a chlorotrifluoroethylene low polymer having a structure in which fluorine and chlorine are bonded to a main chain and fluorine and chlorine are linked to two ends thereof as shown in the following structural formula, for example.

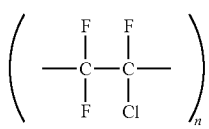

Formula 8

Moreover, the fluorine-based inert liquid may be a fluorine-containing liquid having a perfluoropolyether structure as shown in the following structural formula, for example.

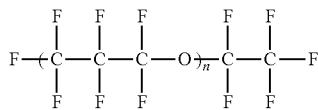

Formula 9

Between the diaphragm 32 and the sensor chip 16 to be placed in a recess formed in an end portion of the hermetic glass 14, a metallic electric potential adjusting member 17 is further supported by a lower end surface 14ES2 of the hermetic glass 14. The electric potential adjusting member 17 is provided with a communication hole as also shown in Japanese Patent No. 3,987,386, for example, and is connected to a terminal to be connected to zero potential of a circuit in the sensor chip 16.

The group of input-output terminals 40ai (i=1 to 8) comprise two power source terminals, one output terminal, and five adjustment terminals. Two end portions of each terminal protrude to the above-mentioned recess formed in the end portion of the hermetic glass 14 and to a hole in a terminal block 24 to be described later, respectively. The two power source terminals and the one output terminal are connected to core wires 38a of respective lead wires 38 through connection terminals 36. Each lead wire 38 is connected to a given pressure measurement device. Note that only four terminals out of the eight terminals are illustrated in FIG. 1.

The sensor chip 16 comprises: a body unit provided with multiple pressure detection elements and formed substantially into a rectangular shape by using silicon, for example;

a circuit layer formed on an upper end surface of the body unit and constituting a processing circuit; an insulating film layer as a second layer to be stacked on an upper surface of the circuit layer as a first layer; a shield layer made of aluminum and formed on the insulating film layer; and a protection layer to protect an upper layer part of the shield layer.

In the above-described example, the sensor chip 16 in the sensor unit is supported by the one end portion of the chip mounting member 18 held in the hermetic glass 14. However, the present invention is not limited to this example. For instance, the sensor chip 16 may be fixed directly to a flat surface constituting the above-mentioned recess in the hermetic glass 14 without using the chip mounting member 18.

The terminal block 24 to align the group of input-output terminals 40ai is molded by using a resin material such as polybutylene terephthalate (PBT), for example. In addition to the multiple holes into which the group of input-output terminals 40ai are to be inserted, the terminal block 24 is provided with a cavity having a prescribed volume and located on an inner side. A lower end surface of the terminal block 24 is attached to an upper end surface 12ES1 of the housing 12 by using a silicone-based adhesive, in such a way as to cover an upper end surface 14ES1 of the hermetic glass 14. Hereby, an annular adhesive layer 10B having a given thickness is formed on the upper end surface 12ES1 of the housing 12.

An annular projection 24P protruding toward the hermetic glass 14 is formed on an inner peripheral surface of the terminal block 24 which forms the cavity, the inner peripheral surface being opposed to the upper end surface 14ES1 of the hermetic glass 14. A length of protrusion of the projection 24P is set according to viscosity and other factors of a covering layer 10A. By forming the annular projection 24P as described above, when the covering layer 10A to be described later is formed, part of the coated covering layer 10A is pulled by surface tension and held in a narrow space between the projection 24P and the inner peripheral surface of the terminal block 24 constituting the cavity of the terminal block 24, which is the inner peripheral surface substantially orthogonal to the upper end surface 14ES1 of the hermetic glass 14. Accordingly, the covering layer 10A is evenly coated without being deviated to one side in the cavity of the terminal block 24.

In addition, a given thickness of the covering layer 10A made of a silicone-based adhesive is formed on the entire upper end surface 14ES1 of the hermetic glass 14 from which the group of input-output terminals 40ai protrude. Here, the covering layer 10A may also be formed at a portion 10AA indicated with hatched lines in FIG. 1 so as to further cover the portions of the group of input-output terminals 40ai protruding from the upper end surface 14ES1 of the hermetic glass 14.

Accordingly, an electrostatic protection layer 10 made of the silicone-based adhesive is formed from the covering layer 10A and the adhesive layer 10B. By forming the electrostatic protection layer 10 using the silicon-based adhesive as described above, the sensor unit improves its resistance to static electricity without being affected by the presence or absence of an ESD protection circuit.

The above-mentioned silicone-based adhesive is preferably a single component agent of an addition type having flexibility, for example. The silicone-based adhesive is a low molecular siloxane bond-containing adhesive, for example.

For example, in the silicone-based adhesive, a substituent group on a silicon atom in polysiloxane of a base polymer may be any one of a methyl group, a phenyl group, a fluorinated hydrocarbon group such as a trifluoropropyl group, and so forth. In addition, the silicone-based adhesive may be mainly composed of a condensation-type silicone rubber having the following structural formula.

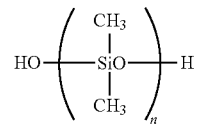

Formula 10

For example, the silicone-based adhesive may be mainly composed of an addition-type silicone rubber having the following structural formula.

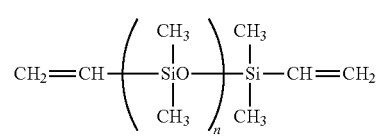

Formula 11

For example, the silicone-based adhesive may be a silicone grease using a silicone oil as a base oil.

In addition, since the silicone-based adhesive is compatible with the silicone oil, even if the silicone oil or the like is mixed with the silicone-based adhesive, the silicone-based adhesive is free from risk of deteriorating its adhesiveness.

Note that the silicone-based adhesive may be a two-component agent, or may be of a condensation type or a UV curing type. A two-component urethane-based adhesive may be used instead of the silicone-based adhesive. In the meantime, when the fluorine-based inert liquid is used as the aforementioned pressure transfer medium, a fluorine-based adhesive may be used because the fluorine-based adhesive is compatible with the fluorine-based inert liquid. A liquid fluorine elastomer having self-adhesiveness is used as the fluorine-based adhesive. Herewith, even if the fluorine-based inert liquid or the like is mixed with the fluorine-based adhesive, the fluorine-based adhesive is free from risk of deteriorating its adhesiveness.

In addition, the fluorine-based adhesive may be replaced with an elastomer having the following structural formula, which contains a perfluoropolyether backbone with a terminal silicone crosslinking group collectively as a filling material.

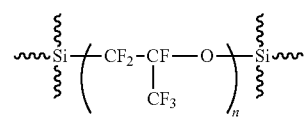

Formula 12

Furthermore, the fluorine-based adhesive may be replaced with a fluorine grease using, as its filling material, any of perfluoropolyalkylether oils having the following structural formulae as a base oil.

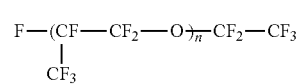

Formula 13

(in which n is a positive integer from 7 to 60)

Formula 14

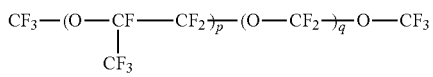

(in which p and q are each a positive integer and satisfy p+q=8 to 45, and p/q=20 to 1000)

$$F-(CF_2-CF_2-CF_2-O-)_r-CF_2-CF_3 \quad \text{Formula 15}$$

(in which r is a positive integer from 3 to 200)

$$CF_3-(O-CF_2-CF_2-)_s-(O-CF_2-)_t-O-CF_3 \quad \text{Formula 16}$$

(in which s and t are each a positive integer and satisfy s+t=40 to 180, and p/q=0.5 to 2)

For example, the fluorine grease may be one having a perfluoropolyether structure with the following structural formula.

Formula 17

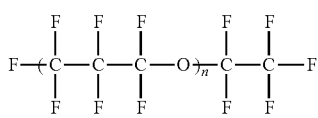

Moreover, the fluorine-based adhesive may be replaced with a perfluoroelastomer having the following structural formula, for example.

Formula 18

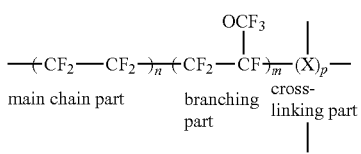

Furthermore, the fluorine-based adhesive may be replaced with a fluorine rubber having the following structural formula, for example.

Formula 19

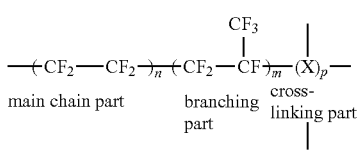

An end cap 22 is connected to an upper end of the terminal block 24 in such a way as to block up the above-mentioned cavity.

A sealing member 26 is filled between an inner peripheral surface of the waterproof casing 20 and outer peripheral surfaces of the terminal block 24 and of the end cap 22, and between the inner peripheral surface of the waterproof casing 20 and an outer peripheral surface of the housing 12. The sealing member 26 is a urethane-based resin, for example.

Note that when the sealing member 26 is the urethane-based resin, a region TR on the outer peripheral surface of the housing 12 may be subjected to a surface roughening treatment in order to improve adhesiveness between the outer peripheral surface of the housing 12 and the urethane-based resin. The surface roughening treatment may apply a surface roughening method disclosed in an International Patent Application (PCT/JP2013/083351) filed by the present applicant, for example.

Moreover, a covering layer 46 may be additionally formed on an upper surface of the sealing member 26, which is filled in the waterproof casing 20, and into a convex shape as indicated with a chain double-dashed line by using an epoxy-based resin or a silicone-based resin, for example. In this way, the covering layer 46 seals the upper surface of the sealing member 26 as well as the lead wires 38, thereby preventing water droplets and the like from trapping on the upper surface of the sealing member 26.

Figure 2A:
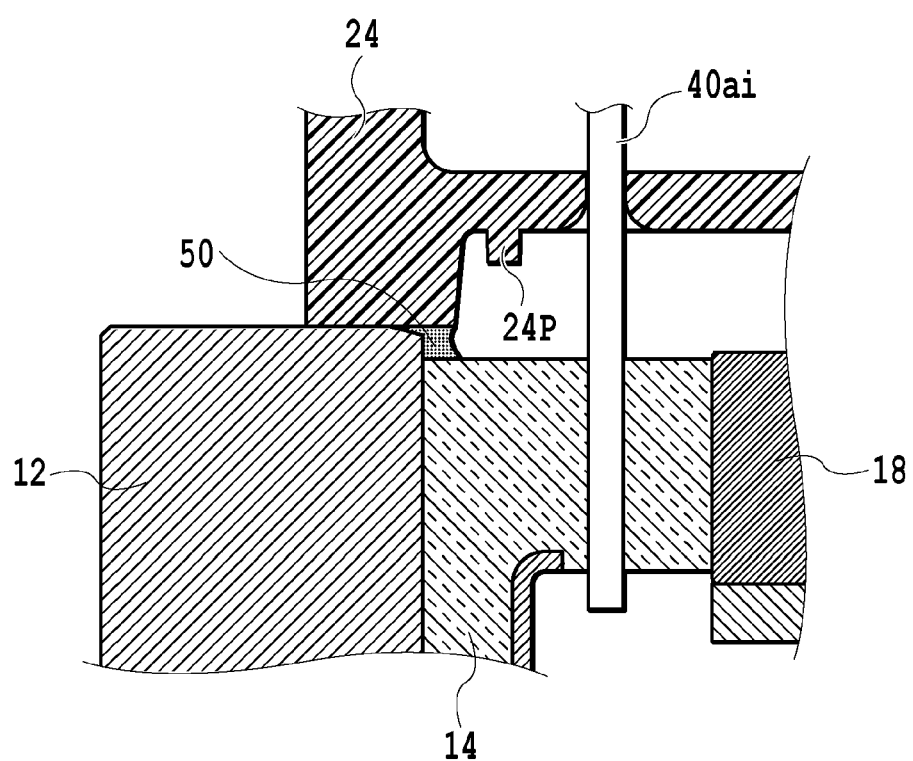
FIG. 2A is a partial cross-sectional view showing another example of an electrostatic protection layer used in the example shown in FIG. 1.
Figure 2B:
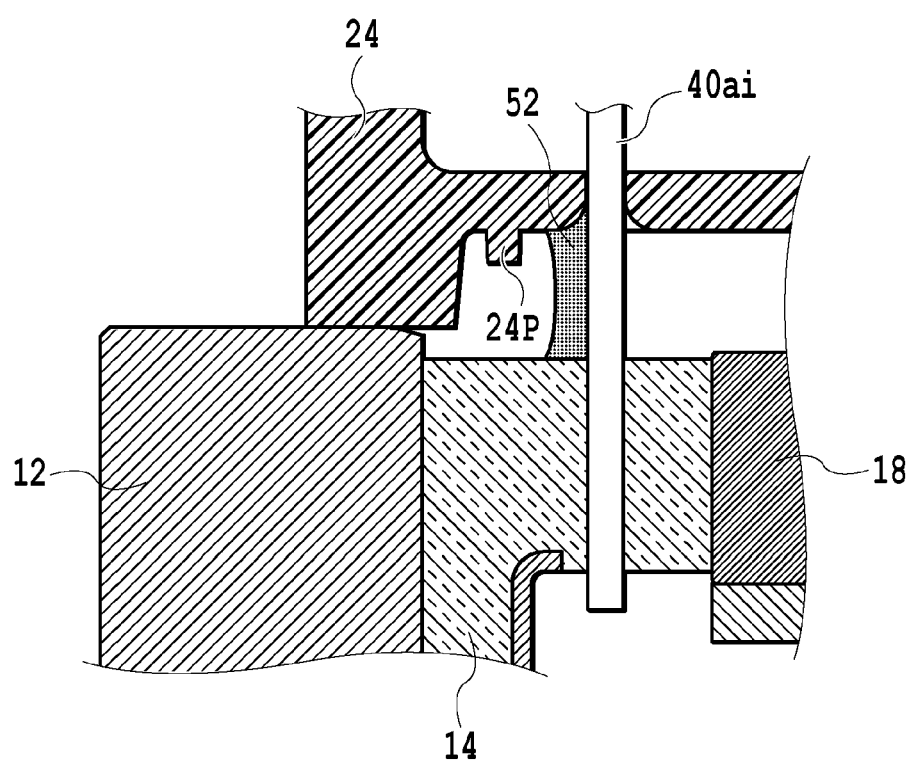
FIG. 2B is a partial cross-sectional view showing still another example of the electrostatic protection layer used in the example shown in FIG. 1.
Figure 2C:
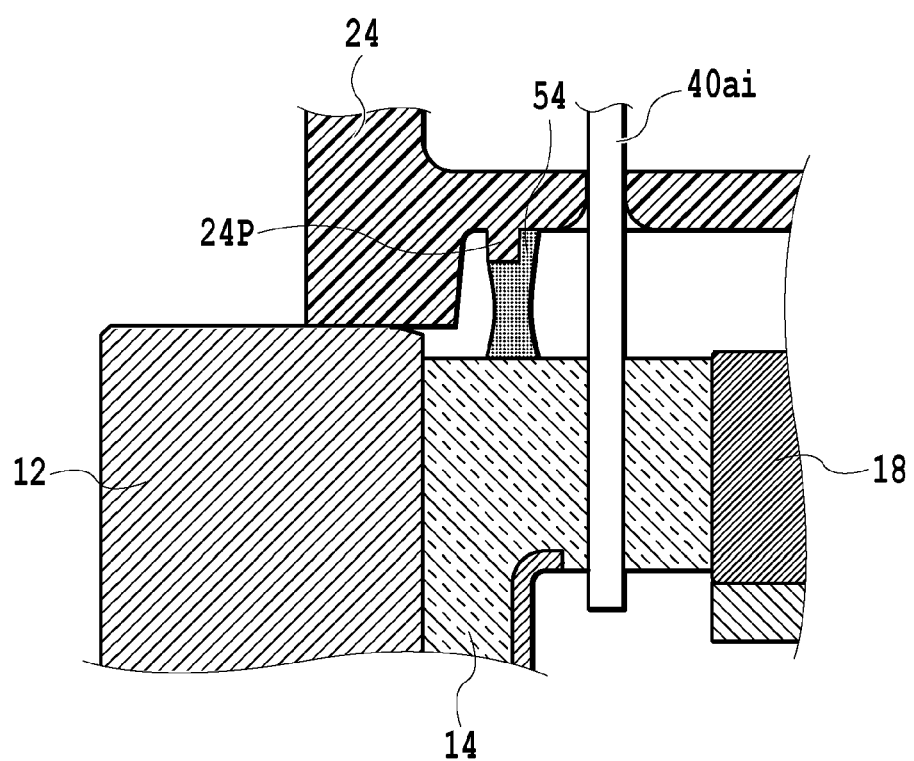
FIG. 2C is a partial cross-sectional view showing yet another example of the electrostatic protection layer used in the example shown in FIG. 1.

In the above-described example, the electrostatic protection layer 10 is formed from the covering layer 10A and the adhesive layer 10B. However, without limitation to this example, an adhesive layer 50, a covering layer 52, and an adhesive layer 54 each constituting an electrostatic protection layer may be formed, respectively, as shown in FIGS. 2A to 2C, for instance. Note that constituents in FIGS. 2A to 2C which are the same as the constituents in the example shown in FIG. 1 will be denoted by the same reference signs and overlapping descriptions thereof will be omitted.

In the example shown in FIG. 2A, the adhesive layer 50 constituting the electrostatic protection layer may be formed only in a relatively small space surrounded by the lower end surface of the terminal block 24, an end surface of the housing 12, and a peripheral edge portion of the upper end surface 14ES1 of the hermetic glass 14.

In the example shown in FIG. 2B, the covering layer 52 may be formed only at a portion of each of the group of input-output terminals 40ai from a point where the terminal 40ai protrudes from the upper end surface 14ES1 of the hermetic glass 14 to a point where the terminal 40ai reaches the terminal block 24.

In the example shown in FIG. 2C, the adhesive layer 54 may be formed to connect the upper end surface 14ES1 of the hermetic glass 14 to the above-described annular projection 24P.

Figure 3:
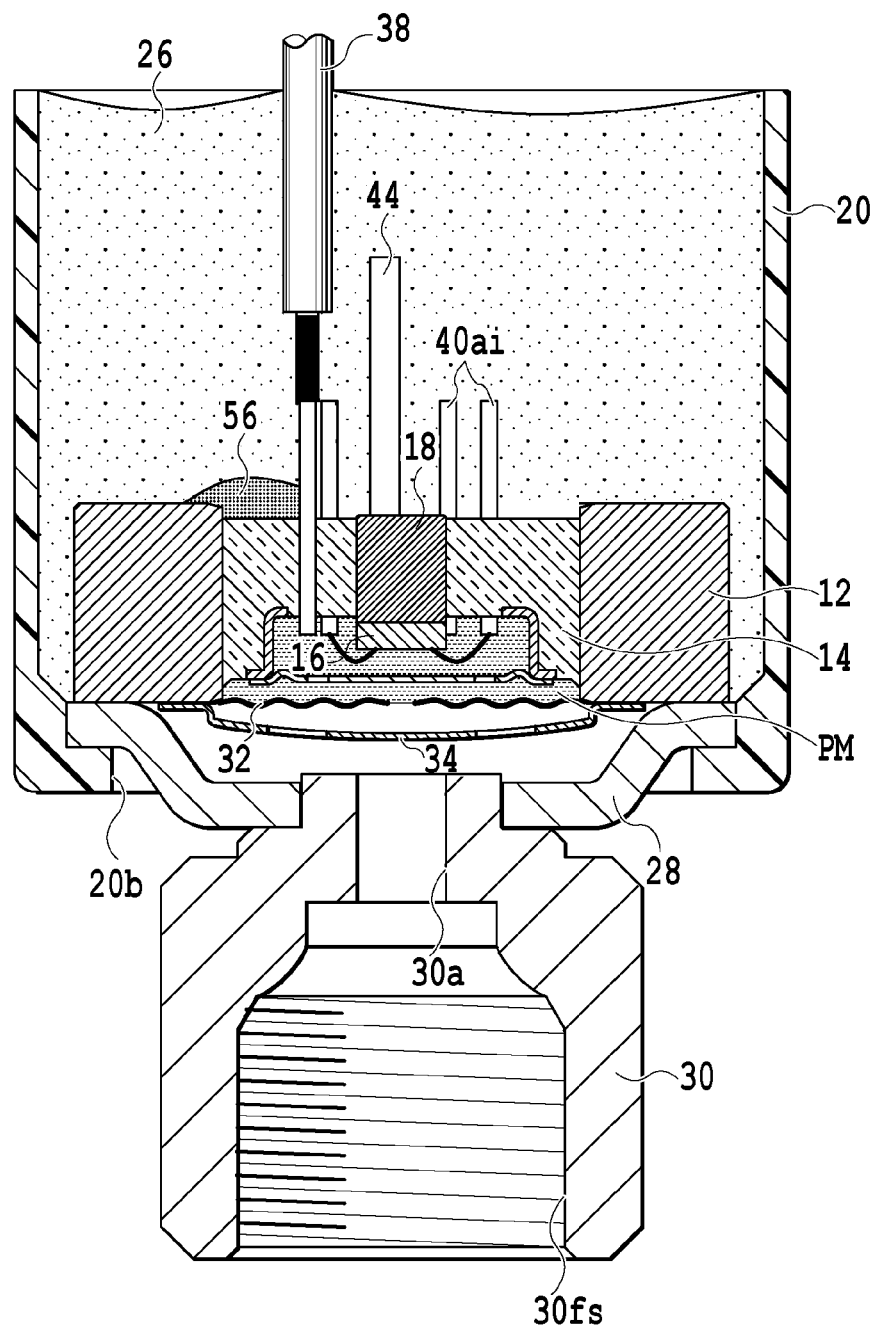
FIG. 3 is a cross-sectional view showing another example of the sensor unit and the pressure detection device containing the same according to the present invention.

FIG. 3 schematically shows another example of the sensor unit and the pressure detection device containing the same according to the present invention.

In the example shown in FIG. 1, the terminal block 24 to align the group of input-output terminals 40ai is provided, and the group of input-output terminals 40ai are connected to the core wires 38a of the respective lead wires 38 through the connection terminals 36. Instead, in the example shown in FIG. 3, the group of input-output terminals 40ai are directly connected to the respective lead wires 38 without providing the terminal block 24. Note that constituents in FIG. 3 which are the same as the constituents in the example shown in FIG. 1 will be denoted by the same reference signs and overlapping descriptions thereof will be omitted.

The pressure detection device comprises the joint member 30 connected to the pipe to which a fluid being a target of pressure detection is introduced, and the sensor unit accommodating portion connected to the base plate 28 of the joint member 30 and configured to accommodate a sensor unit to be described later and to supply the detection output signal from the sensor chip to the given pressure detection device.

On the entirety of a region covering a portion of an upper end surface of the hermetic glass 14 where the group of input-output terminals 40ai protrude and an inner peripheral edge of an upper end surface of the cylindrical housing 12, a covering layer 56 constituting an electrostatic protection layer is formed annularly in a given thickness and continuously across the entire circumference. For example, the covering layer 56 may be any of the silicone-based adhesive, the fluorine-based adhesive, and the elastomer having the following structural formula which contains the perfluoropolyether backbone with the terminal silicone crosslinking group collectively as the filling material, as described previously.

Figure 4A:
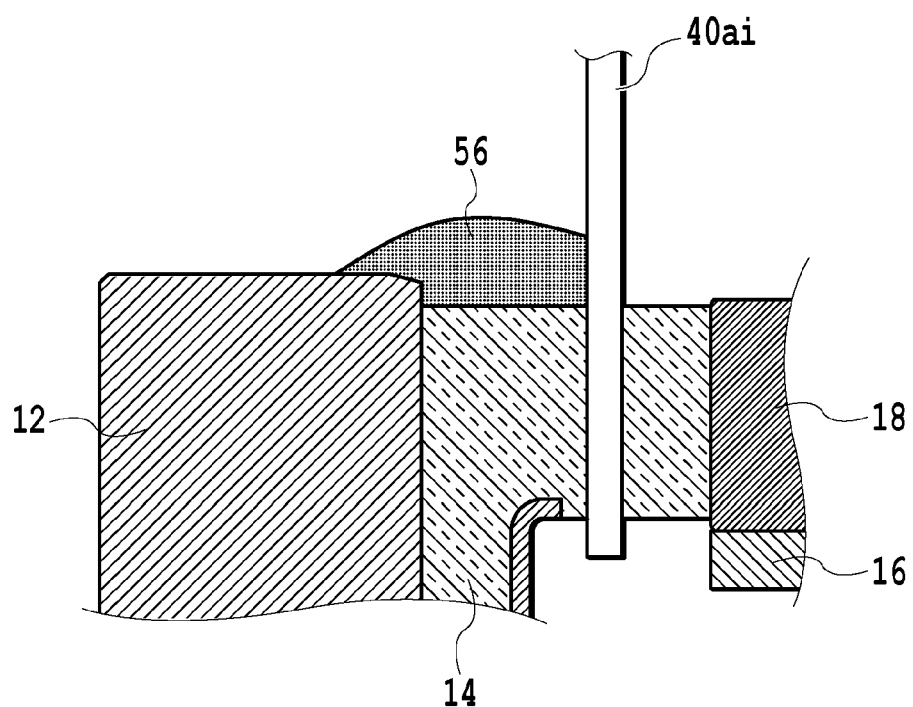
FIG. 4A is a partial cross-sectional view showing a partial enlarged electrostatic protection layer used in the example shown in FIG. 3.
Figure 4B:
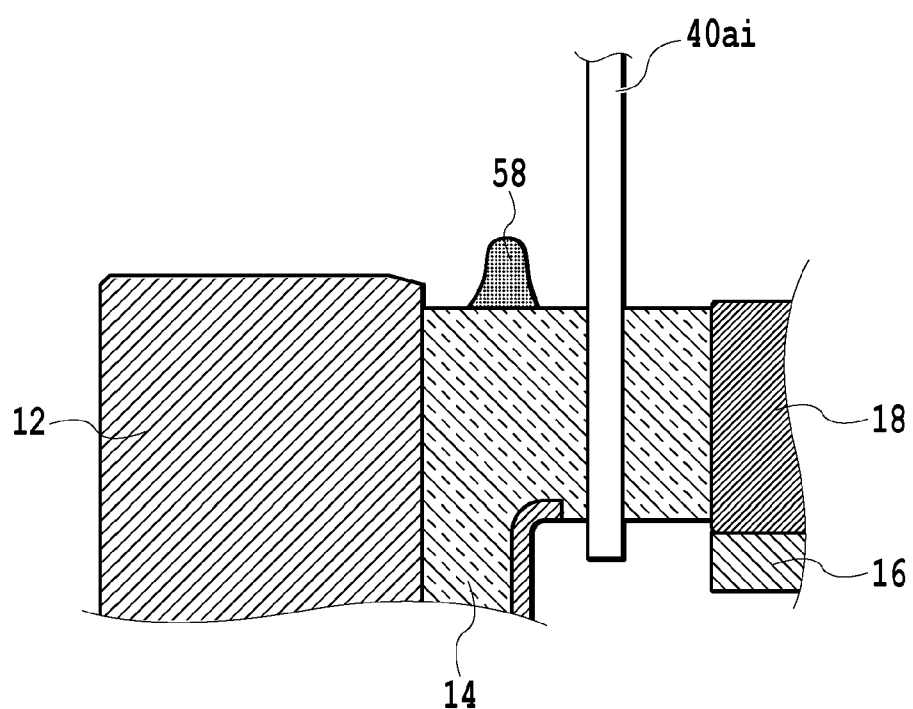
FIG. 4B is a partial cross-sectional view showing another example of the partial enlarged electrostatic protection layer used in the example shown in FIG. 3.

The covering layer 56 is not limited to this example. As shown in FIG. 4B, for instance, a covering layer 58 constituting an electrostatic protection layer may be formed annularly in a given thickness and continuously across the entire circumference in a region between the portion of the upper end surface of the hermetic glass 14 where the group of input-output terminals 40$ai$ protrude and the inner peripheral edge of the upper end surface of the housing 12, the region being located away from the inner peripheral edge and from the group of input-output terminals 40$ai$.

Figure 4C:
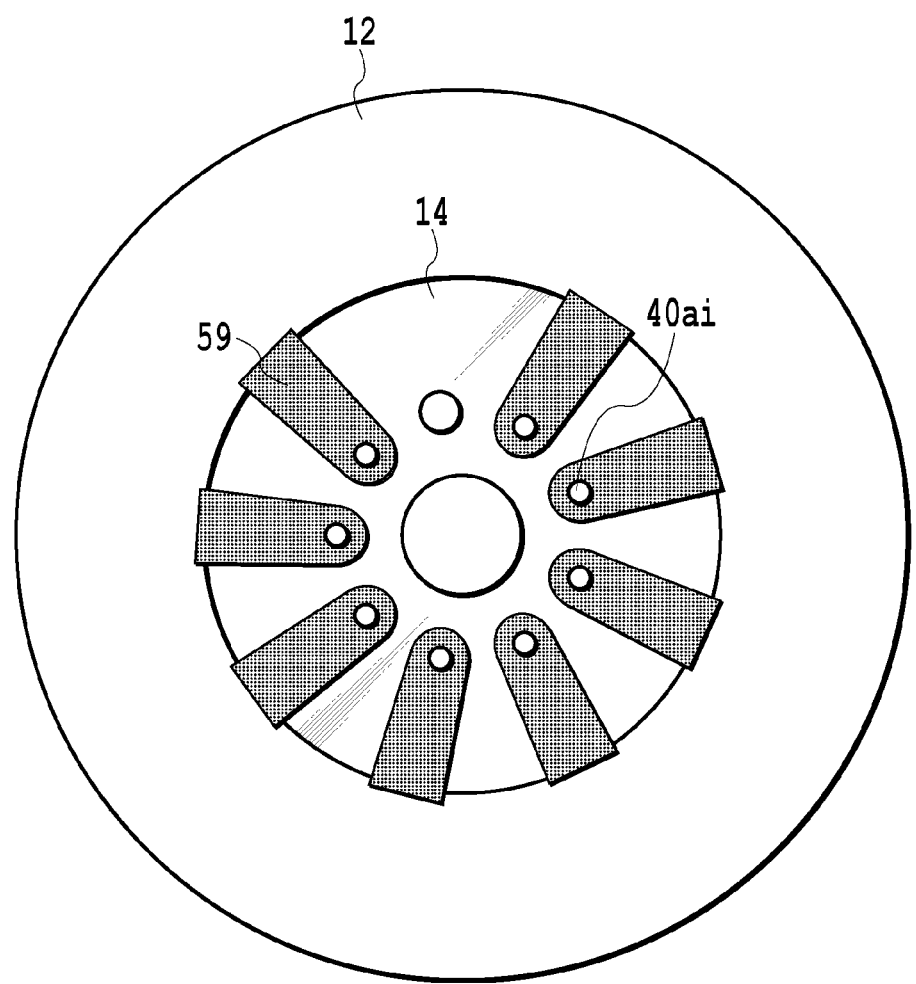
FIG. 4C is a partial cross-sectional view showing still another example of the partial enlarged electrostatic protection layer used in the example shown in FIG. 3.

In addition, as shown in FIG. 4C, for instance, coating layers 59 each constituting an electrostatic protection layer may be formed at peripheral edges of the portion of the upper end surface of the hermetic glass 14 where the group of input-output terminals 40$ai$ protrude, in such a way as to be located away from one another and in a diverging fashion. The respective covering layers 59 may be formed radially in a given thickness in such a way as to extend from portions where the respective input-output terminals constituting the group of input-output terminals 40$ai$ protrude to the upper end surface of the housing 12 along radial directions.

Figure 5:
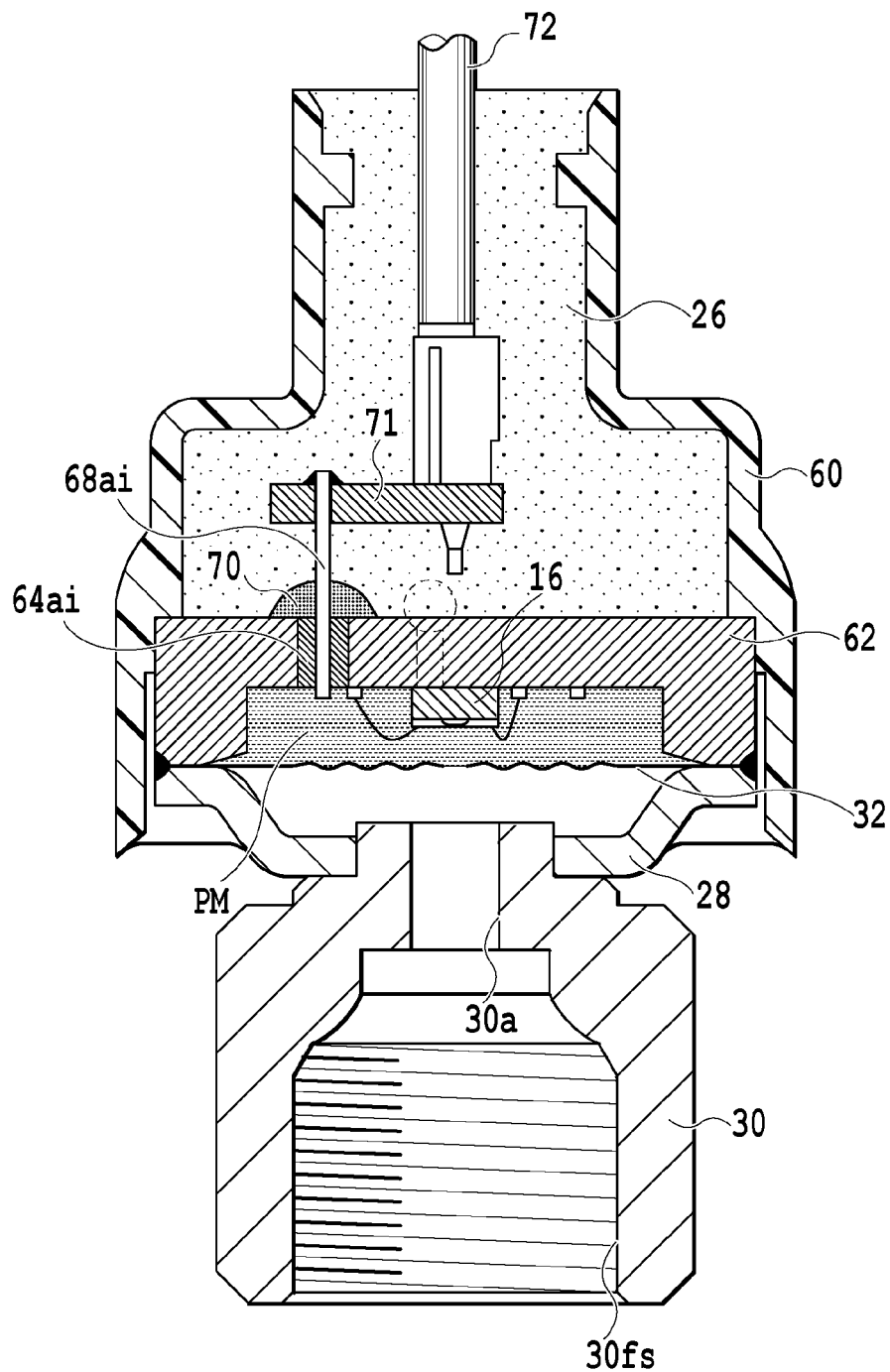
FIG. 5 is a cross-sectional view showing yet another example of the sensor unit and the pressure detection device containing the same according to the present invention.

FIG. 5 schematically shows still another example of the sensor unit and the pressure detection device containing the same according to the present invention.

In the example shown in FIG. 1, there is provided the terminal block 24 to align the group of input-output terminals 40$ai$ which are arranged along a common circumferential direction in the hermetic glass 14, and the group of input-output terminals 40$ai$ are connected to the core wires 38$a$ of the respective lead wires 38 through the connection terminals 36. Instead, in the example shown in FIG. 5, input-output terminals constituting a group of input-output terminals 68$ai$ (i=1 to 8) are held by a housing 62 in a state of being individually covered with hermetic glasses 64$ai$ (i=1 to 8). Moreover, the group of input-output terminals 68$ai$ are directly connected to respective lead wires 72 through connection terminals 71 without providing the terminal block 24. Note that constituents in FIG. 5 which are the same as the constituents in the example shown in FIG. 1 will be denoted by the same reference signs and overlapping descriptions thereof will be omitted.

The pressure detection device comprises the joint member 30 connected to the pipe to which a fluid being a target of pressure detection is introduced, and the sensor unit accommodating portion connected to the base plate 28 of the joint member 30 and configured to accommodate a sensor unit to be described later and to supply the detection output signal from the sensor chip to the given pressure detection device.

A contour of the sensor unit accommodating portion is formed from a cylindrical waterproof casing 60 serving as a cover member. An opening is formed at a lower end portion of the waterproof casing 60 made of a resin. The peripheral edge of the base plate 28 of the joint member 30 is engaged with a peripheral edge of the opening located inside. A lower end surface of the housing 62 of the sensor unit is placed on the base plate 28.

The sensor unit which detects a pressure inside the pressure chamber 28A and sends the detection output signal comprises, as its main constituents: the housing 62; the metallic diaphragm 32 that isolates the pressure chamber 28A from an inner peripheral portion of the housing 62; the sensor chip 16 that includes the multiple pressure detection elements; the group of input-output terminals 68$ai$ (i=1 to 8) that are electrically connected to the sensor chip 16; and the hermetic glasses 64$ai$ (i=1 to 8) that individually fix respective terminals constituting the group of input-output terminals 68$ai$ to spaces in inner peripheral surfaces of respective holes in the housing 62.

The group of input-output terminals 68$ai$ comprise two power source terminals, one output terminal, and five adjustment terminals. One end portion of each terminal is inserted into an end portion of the corresponding hole in the housing 62 through the corresponding hermetic glass 64$ai$ mentioned above. The two power source terminals and the one output terminal are connected to core wires of the respective lead wires 72 through the connection terminals 71.

Figure 6A:
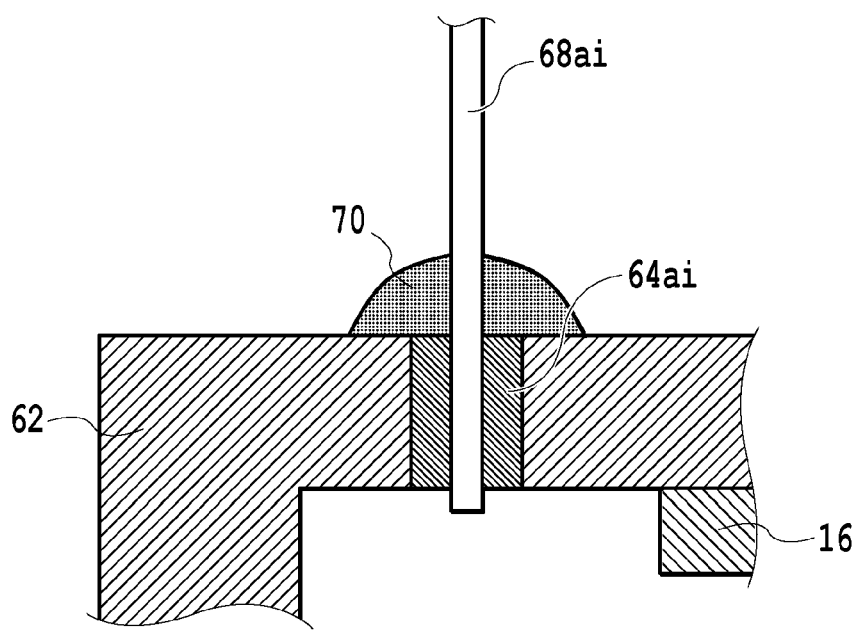
FIG. 6A is a partial cross-sectional view showing a partial enlarged electrostatic protection layer used in the example shown in FIG. 5.

As shown in the enlarged view of FIG. 6A, a covering layer 70 made of a silicone-based adhesive is formed in a given thickness as the electrostatic protection layer on an upper end surface of each hermetic glass 64$ai$ from which the corresponding input-output terminal constituting the group of input-output terminals 68$ai$ protrudes, and on an upper end surface of a peripheral edge of the hermetic glass 64$ai$ in the housing 62. The covering layer 70 is not limited to this example. For instance, the covering layer 70 may be any of the fluorine-based adhesive, and the elastomer having the following structural formula which contains the perfluoropolyether backbone with the terminal silicone crosslinking group collectively as the filling material, as described previously.

Figure 6B:
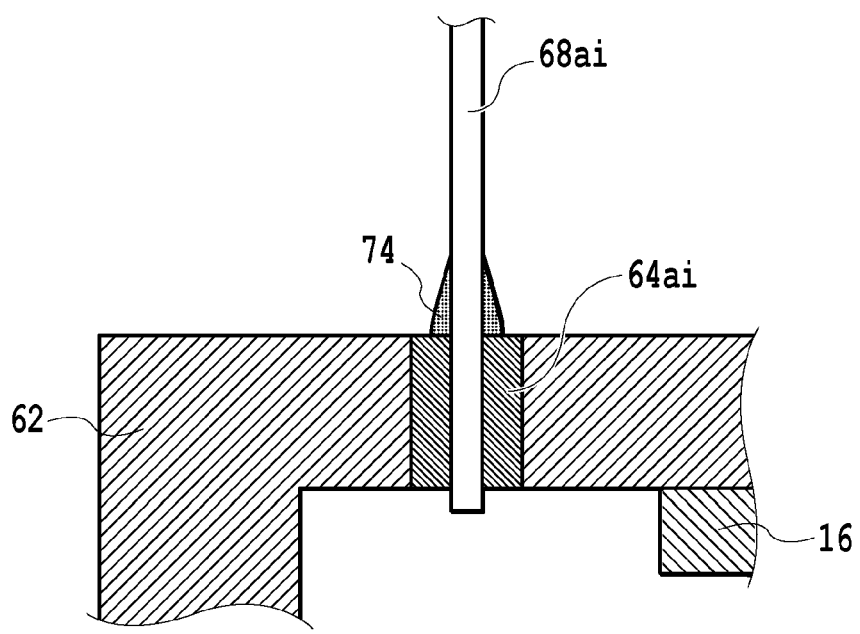
FIG. 6B is a partial cross-sectional view showing another example of the partial enlarged electrostatic protection layer used in the example shown in FIG. 5.

The covering layer as the electrostatic protection layer is not limited to these examples. For instance, as shown in the enlarged view of FIGS. 6B and 6D, a covering layer 74 or a covering layer 78 may be formed in such a way as to cover only the upper end surface of each hermetic glass 64$ai$ from which the corresponding input-output terminal protrudes, and part of the input-output terminal.

Figure 6C:
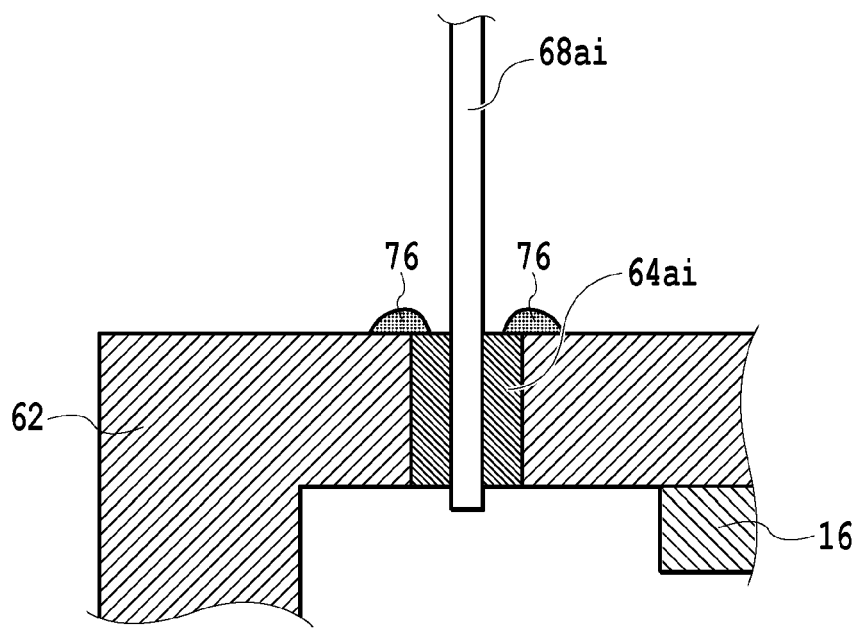
FIG. 6C is a partial cross-sectional view showing still another example of the partial enlarged electrostatic protection layer used in the example shown in FIG. 5.
Figure 6D:
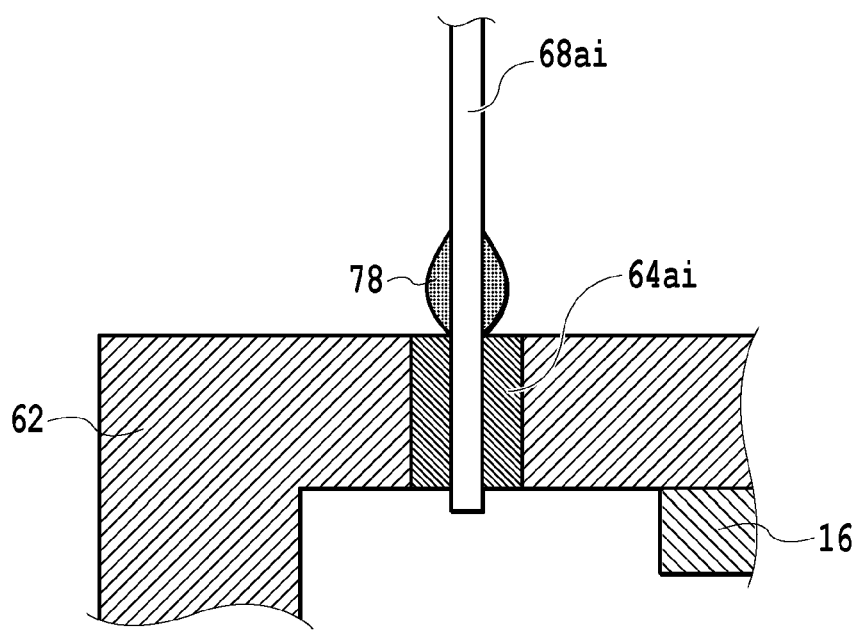
FIG. 6D is a partial cross-sectional view showing yet another example of the partial enlarged electrostatic protection layer used in the example shown in FIG. 5.

In addition, as shown in the enlarged view of FIG. 6C, a covering layer 76 as the electrostatic protection layer may be formed at a location away from the input-output terminal and in such a way as to extend over the upper surface of each hermetic glass 64$ai$ and an upper end surface of the housing 62.

Figure 6E:
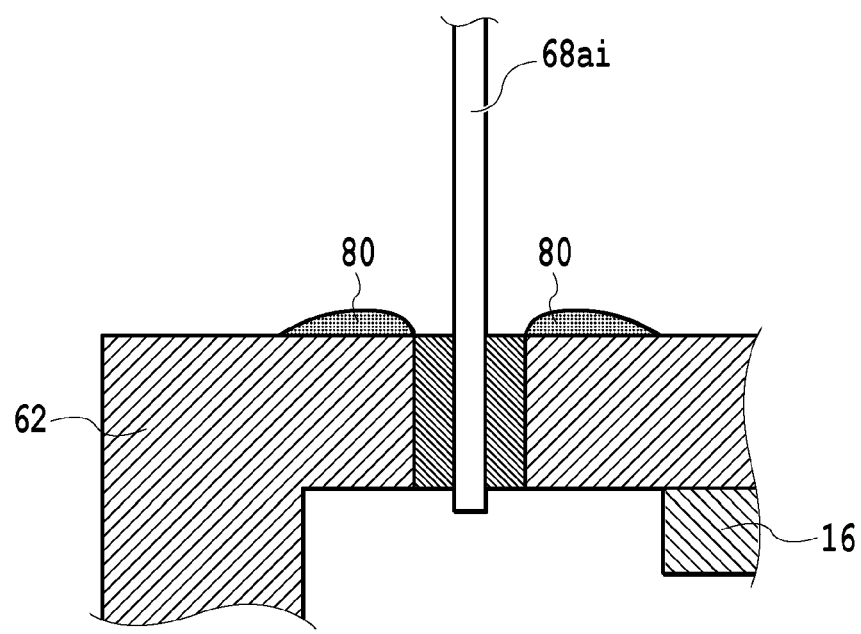
FIG. 6E is a partial cross-sectional view showing yet another example of the partial enlarged electrostatic protection layer used in the example shown in FIG. 5.

Furthermore, as shown in the enlarged view of FIG. 6E, a covering layer 80 as the electrostatic protection layer may be formed at a location away from the input-output terminal and on the upper end surface of the housing 62 adjacent to the vicinity of the upper end surface of each hermetic glass 64$ai$, and in such a way as to surround the hermetic glass 64$ai$.

It will be noted that the example of the pressure detection device according to the present invention is provided with the joint member 30 having the female screw portion to be connected to the pipe, to which the fluid being the target of pressure detection is introduced, but the present invention is not limited to this example, for instance, the joint member 30 may be provided with a male screw portion instead of the female screw portion. Alternatively, a connection pipe made of copper may be connected instead of the joint member 30.

REFERENCE SIGNS LIST

10 electrostatic protection layer
10A covering layer
10B adhesive layer
12 housing 14 hermetic glass
16 sensor chip
18 chip mounting member
24 terminal block
26 sealing member
46 covering layer

The invention claimed is:

1. A sensor unit comprising:
a sensor chip configured to detect a pressure;
a housing configured to accommodate the sensor chip and a hermetic glass surrounding at least one terminal electrically connected to a circuit in the sensor chip;
a diaphragm configured to isolate the sensor chip and the terminal from a pressure chamber of which a pressure is to be detected;
a pressure transfer medium filled between the diaphragm and the sensor chip, and
an electrostatic protection layer made of an adhesive selected according to a component of the pressure transfer medium is formed to cover any of:
one end surface of the hermetic glass from which the terminal protrudes,
one end surface of the housing, and
a surface defined by a portion of the terminal protruding from the one end surface of the hermetic glass;
a casing, wherein the sensor ship and the housing are disposed inside the casing, wherein a first portion of the housing faces the diaphragm and a second portion does not face the diaphragm; and
a sealing member, on the one end surface of the housing or is positioned to contact both an inner peripheral surface of the casing and the second portion of the housing.

2. The sensor unit according to claim 1, wherein a silicone-based adhesive is selected when the pressure transfer medium is a silicone oil.

3. The sensor unit according to claim 1, wherein any one of a silicone-based adhesive and a fluorine-based adhesive is selected when the pressure transfer medium is a fluorine-based liquid.

4. A pressure detection device comprising:
a sensor unit accommodating portion configured to accommodate the sensor unit according to claim 1, and
a terminal block configured to align the terminals of the sensor unit,
an end portion of the terminal block to align the terminals is attached to the one end surface of the housing with any one of a silicone-based adhesive and a fluorine-based adhesive, and
a peripheral edge of the diaphragm is joined to another end surface of the housing.

5. The pressure detection device according to claim 4, wherein a covering layer made of an epoxy-based resin is formed on an upper surface of the sealing member to seal the terminal block and the housing.

6. The pressure detection device according to claim 4, wherein a covering layer made of a silicone-based resin is formed on an upper surface of the sealing member to seal the terminal block and the housing.

7. The pressure detection device according to claim 4, wherein the electrostatic protection layer is formed only at a portion surrounded by the end portion of the terminal block, an inner peripheral surface of the housing, and the one end surface of the hermetic glass.

8. The pressure detection device according to claim 4, wherein the electrostatic protection layer is formed only at a portion on the terminal from the one end surface of the hermetic glass to the terminal block.

9. The pressure detection device according to claim 4, wherein the electrostatic protection layer is formed only at a portion from an annular projection formed adjacent to the terminal on the terminal block to the one end surface of the hermetic glass opposed to the projection.

10. The sensor unit of claim 1, wherein the second portion includes at least a part of the one end surface of the housing.

11. A sensor unit comprising:
a sensor chip configured to detect a pressure;
a housing configured to accommodate the sensor chip and a hermetic glass surrounding at least one terminal electrically connected to a circuit in the sensor chip;
a diaphragm configured to isolate the sensor chip and the terminal from a pressure chamber, of which a pressure is to be detected; and
a pressure transfer medium filled between the diaphragm and the sensor chip, and
an electrostatic protection layer made of a filling material selected according to a component of the pressure transfer medium is formed to cover any of:
one end surface of the hermetic glass from which the terminal protrudes,
one end surface of the housing, and
a surface defined by a portion of the terminal protruding from the one end surface of the hermetic glass,
wherein the filling material comprises an elastomer;
a casing, wherein the sensor ship and the housing are disposed inside the casing, the casing including a first end configured to receive a base plate and a second end, wherein lead wires are inserted into an interior of the casing through the second end; and
a sealing member positioned in the interior and configured to seal the second end and the lead wires.

12. The sensor unit according to claim 11, wherein any one of an elastomer and a fluorine grease is selected as the filling material when the pressure transfer medium is a fluorine-based liquid.

13. A pressure detection device comprising:
a sensor unit accommodating portion configured to accommodate
the sensor unit according to claim 4, and
a terminal block configured to align the terminals of the sensor unit,
an end portion of the terminal block is joined to the one end surface of the housing with the filling material, and
a peripheral edge of the diaphragm is joined to another end surface of the housing.

14. The pressure detection device according to claim 13, wherein a coating layer made of an epoxy-based resin is formed on an upper surface of a sealing member to seal the terminal block and the housing.

15. The pressure detection device according to claim 13, wherein a coating layer made of a silicone-based resin is formed on an upper surface of a sealing member to seal the terminal block and the housing.

* * * * *